United States Patent [19]

Vogt

[11] 4,096,232

[45] Jun. 20, 1978

[54] EXTRACTION OF ANTIMONY FROM ANTIMONY SULFIDES BEARING SOLIDS

[75] Inventor: John William Vogt, Chagrin Falls, Ohio

[73] Assignee: The Harshaw Chemical Company, Cleveland, Ohio

[21] Appl. No.: 780,736

[22] Filed: Mar. 24, 1977

[51] Int. Cl.$^2$ ............................................. C01B 29/02
[52] U.S. Cl. ...................................... 423/87; 423/617
[58] Field of Search ................ 423/87, 617; 75/101 R

[56] References Cited

U.S. PATENT DOCUMENTS

| | | | |
|---|---|---|---|
| 1,447,203 | 3/1923 | Ellis et al. | 423/87 |
| 1,548,854 | 8/1925 | Schleicher | 423/87 |
| 2,687,953 | 8/1954 | Kenny et al. | 423/33 |
| 2,727,819 | 12/1955 | Kenny et al. | 423/33 |
| 2,772,146 | 11/1956 | Pippig | 423/573 |
| 2,911,438 | 11/1959 | Von Szombathy | 260/512 R |
| 3,035,889 | 5/1962 | Nicklin et al. | 423/573 |
| 4,005,176 | 1/1977 | Fernschild et al. | 423/87 |

FOREIGN PATENT DOCUMENTS 11,123 of 1905 United Kingdom .................. 423/87

*Primary Examiner*—O. R. Vertiz
*Assistant Examiner*—Wayne A. Langel
*Attorney, Agent, or Firm*—Armand P. Boisselle

[57] ABSTRACT

A method for extracting antimony from solids containing antimony sulfides is described. An improvement in the method of extracting antimony by oxidation of an aqueous mixture of the solids in an acid or by oxidation of a leaching liquor obtained by leaching the antimony from the solids with an aqueous basic solution comprises conducting the oxidation in the presence of a catalyst comprising a water-soluble copper salt, a quinone, a hydroquinone or mixtures of one or more of these. The catalyst significantly increases the rate of oxidation and the rate of the recovery of the antimony from antimony sulfide bearing solids, particularly natural ores. Where the oxidation is conducted in a basic solution, the antimony is recovered as pentavalent antimony in the form of metal antimonates. Facile reduction of the metal antimonate to antimony trioxide also is described.

33 Claims, No Drawings

EXTRACTION OF ANTIMONY FROM ANTIMONY SULFIDES BEARING SOLIDS

BACKGROUND OF THE INVENTION

Natural ores containing antimony sulfides, or concentrates derived from such ores, are commonly roasted in air to recover the antimony values as the metal or oxide. This process generates large quantities of $SO_2$ gas, an objectionable air pollutant. The roasting process also converts arsenic present in the ore to arsenic compounds incorporated as an impurity in the antimony product. This arsenic impurity may be tolerable when the ore or ore concentrate contains minute amounts of arsenic, but many ores contain such large amounts that the resultant product of air roasting is unacceptable.

These two aspects of air roasting — generation of sulfur dioxide gas and failure to isolate antimony from arsenic impurity—are avoided by use of a wet process. One such wet process involves dissolving the antimony sulfides in an alkaline liquor and then oxidizing the liquor with oxygen or air. This normally very slow oxidation reaction converts the antimony to antimonate, which may be separated as an insoluble metal antimonate, while the products of oxidation of the sulfide ion remain dissolved in the liquor. Most of the arsenic remains in the ore residues as very insoluble compounds.

SUMMARY OF THE INVENTION

The present invention provides and improved wet method of extracting and isolating antimony from solids containing antimony sulfides. The invention more specifically relates to a method of extracting antimony by oxidation of either an aqueous mixture of the antimony sulfide bearing solids and an acid, or by oxidation of a leaching liquor obtained by leaching the antimony from the solids with an aqueous basic solution. An improvement in the method comprises conducting the oxidation in the presence of a catalyst which may be a water-soluble copper salt, a quinone, a hydroquinone or mixtures of one or more of these. Where the oxidation reaction is conducted in an alkaline medium, the antimony is recovered as pentavalent antimony in the form of a metal antimonate such as sodium antimonate and potassium antimonate. A variety of metal antimonates can be prepared in this manner and these products are substantially free of any arsenic which may have been present in the starting material. A pure form of antimony oxide can be produced by reducing the antimonates.

DESCRIPTION OF THE PREFERRED EMBODIMENTS

The present invention relates to an improvement in the extraction of antimony from antimony sulfide bearing solids, particularly naturally occuring ores and ore concentrates by oxidation of either (a) an aqueous mixture of the solids and an acid, or (b) a leaching liquor obtained by leaching the antimony from the solids with an aqueous basic solution. An improvement of either of these oxidation procedures is obtained by incorporating into the aqueous mixtures of a leaching liquor, a catalyst comprising a water-soluble copper salt, a quinone, a hydroquinone, or mixtures of one or more of these prior to the oxidation.

The product of the oxidation reaction in an acid medium is trivalent antimony ions. When the oxidation is conducted in a basic or alkaline solution, the product of the reaction is pentavalent antimony ions which are recovered from the solution as metal antimonates. The antimony obtained in this manner is substantially free of any significant amounts of arsenic even when the starting material contains up to 3 to 4% of arsenic. The rate of the oxidation reaction is increased by the presence of the above-described catalysts which are found to be most effective in the alkaline or basic medium. Whether the oxidation is conducted in an acid or alkaline medium, there is essentially no undesirable gaseious sulfur products such as sulfur dioxide or hydrogen sulfide observed.

The first step in the procedure of this invention for extracting and isolating pentavalent antimony from solids containing antimony sulfides in an alkaline or basic medium is the leaching of the antimony values from solids with an aqueous basic solution to form an antimony-containing solution. Basic solutions such as those obtained by dissolving a base such as the alkali and alkaline earth metal oxides, hydroxides, carbonates and mixtures thereof are useful. Specific examples include sodium oxide, sodium hydroxide, potassium hydroxide, sodium carbonate, calcium hydroxide, and mixtures of such bases in water. The concentration of the basic material dissolved in the water is not critical although concentrations of the base of from about 5 to about 25% by weight or higher are preferred. Although the antimony dissolves in the basic solution, most arsenic in the solids remains with the gangue thus giving a substantially arsenic free final product.

Sodium hydroxide solutions are one of the preferred basic leaching solutions since the antimonate which is formed during the oxidation step is insoluble, and this facilitates isolation of the product. On the other hand, when sodium hydroxide is used, some of the insoluble sodium antimonate is formed immediately in the leach solution and may be lost with the gangue as it is removed. This problem is minimized by including a small amount of sodium sulfide in the sodium hydroxide solution used for leaching the antimony from the ore. The presence of the sodium sulfide inhibits the formation of the unsoluble antimonate in the leach solution. The weight ratio of sodium hydroxide to sodium sulfide (if present) may be from about 1:1 to 3:1.

Aqueous potassium hydroxide solutions are another preferred example of the basic leach solutions used in the invention. When potassium hydroxide is used, the immediate and the final antimony compounds are soluble in water and, therefore, the valuable antimony products are not lost when the gangue is separated. Also, because of the water solubility of potassium antimonate which is formed, the gangue need not be separated immediately after the antimony values are leached from the ore, but the gangue may be removed after the oxidation is complete or at some earlier intermediate stage of oxidation. Also, it is unnecessary to add any sulfide to the leach solution thereby improving the purity of the final product.

After the antimony values have been leached from the ore with an aqueous basic solution as described above, a catalyst is added into the leach solution which facilitates and increases the speed of oxidation of the trivalent antimony to pentavalent antimony. The catalyst which is particularly useful in the method of the invention comprises a water-soluble copper salt, a quinone, a hydroquinone, or mixtures of one or more of these materials. In addition to the above named materials, the catalyst may also contain ferrous ions. For example, the effectiveness of copper ions appears to be improved by the presence of a small amount of ferrous ions. Copper salts which are useful include copper sulfate, copper chloride, etc. The catalyst also may be a quinone which may be defined as a cyclic unsaturated ketone having two carbonyl groups directly attached to a six-membered ring containing two double bonds (*Nomenclature of Organic Compounds*, John H. Fletcher et al, editors, American Chemical Society, Washington, D. C., 1974, page 225). The six-membered ring may contain various substituents such as alkyl groups, halogens, etc., so long as the substituents do not interfere with catalytic effect of the quinone structure. The term quinone as used in this specification and the attached claims also includes polynuclear quinones wherein the above defined six-membered ring is attached to one or more six-membered rings containing three double bonds. Examples of such polynuclear quinones include 1, 4-naphthalene dione; 1, 2-naphthalene dione; 9, 10-anthracene dione.

The hydroquinones which are useful as a catalyst in the process of the invention are the hydroquinones derived from the above described quinones. Thus, the hydroquinones may be defined as cyclic unsaturated diols having two hydroxy groups directly attached to a six-membered ring containing three double bonds (i.e. a benzene ring). The relationship between the quinones and hydroquinones may be illustrated as follows:

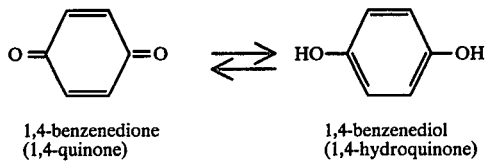

1,4-benzenedione      1,4-benzenediol
(1,4-quinone)      (1,4-hydroquinone)

Examples a hydroquinones which are useful as a catalysts in the invention include benzenediol compounds such as 1, 2-benzenediol (pyrocatechol) and 1,4-benzenediol.

Mixtures of water- soluble copper salts and a hydroquinone have been found to be particularly useful as a catalyst in the method of the invention. For example, even though the oxidation of an ore concentrate containing antimony sulfide or 1,4-benzenediol, or even greater increase in the rate of oxidation is obtained when the combination of copper sulfate and 1,4-benzenediol is utilized as the catalyst. In general, the catalytic mixtures will comprise a copper salt and a hydroquinone in a weight ratio of from about 1:1 to about 1:5 and preferably from about 1:1 to about 1:3.

Oxygen is passed through the basic leach solution containing the catalyst, and the antimony present in the solution is oxidized to pentavalent antimony without the evolution of sulfur containing gases. Any source of oxygen may be utilized including pure oxygen or air which preferably is bubbled through the solution to provide maximum contact with the liquor. The oxidation reaction is exothermic and the solution temperature rises spontaneously. External heat may be supplied to raise the temperature of the solution which reduces the reaction time. Completion of the oxidation reaction is indicated by a peaking and decline of the solution temperature and a negative sulfide ion test.

The amount of catalyst utilized in the method of the invention may vary depending on the variety of conditions and can be determined readily by one skilled in the art. In general, it has been found that from about 0.5 to about 1.5 percent by weight of the catalyst based on the weight of ore is satisfactory for catalyzing the oxidation reaction of antimony bearing solids such as ore concentrate containing about 50 to 70% antimony sulfides.

With potassium hydroxide solutions there is considerable saving in time and energy since the leaching and the air oxidation can be simultaneously effected because of the solubility of the potassium antimonate. Oxidation with air or oxygen is begun immediately upon mixing of the ore, potassium hydroxide and catalyst, and the gangue need not be separated until the oxidation is completed. Heat supplied from the exothermic reactions which occur warms the reaction mixture thus promoting a continuous and eventually complete leaching of the antimony values from the ore.

After the oxidation has been completed and the gangue removed by filtration, the soluble potassium antimonate can be recovered or converted to a desired insoluble antimonate by adding a metal-containing reagent which will precipitate an insoluble metal antimonate. For example, sodium antimonate can be precipitated from a solution of potassium antimonate by the addition of a sodium salt such as sodium chloride, sodium carbonate, sodium oxide, sodium hydroxide, etc. Similarly antimonates of calcium, barium, copper and other metals can be produced from the potassium antimonate solution by precipitation with the corresponding soluble metal compounds including halides, oxides, hydroxides, carbonates, sulfates, etc.

The following examples illustrate the method of the invention for extracting and isolating antimony from solids containing antimony sulfides utilizing an alkaline medium. Unless otherwise indicated, all percentages are by weight.

EXAMPLE 1.

A mixture of 200 grams of a domestic ore containing antimony sulifde and analyzing at about 50% antimony and 3.6% arsenic, 80 grams of sodium hydroxide, 80 grams of sodium sulfide (60%) and 1,400ml. of water is prepared and digested at a temperature of from about 60° to 80° C for 1.5 hours. The mixture is filtered hot and the residue is washed and dried. The gangue obtained in this matter weighs 56 grams.

To the filtrate there is added 0.5 grams of copper sulfate pentahydrate and 2.0 grams of hydroquinone. The mixture is sparged with air for 4.5 hours when a negative test for soluble sulfide is obtained. During the oxidation, the temperature rises to about 70°–80° C. Upon completion of the oxidation, the reaction mixture contains insoluble hydrated sodium antimonate.

EXAMPLE 2

Sodium hydroxide (25g) is dissolved in 800ml. of water whereupon 40g of stibnite is added along with 0.5g of of hydroquinone and 0.5g of copper sulfate pentahydrate. The mixture is sparged with air for about two hours. During this period, the temperature rises from about 30° C to about 44° C in about 45 minutes and then decreases. At the end of the two hour period a test for sulfide ion is negative, and the mixture is at a pH of eight. The liquid slurry is decanted from the gangue, and decantate is allowed to stand to clear. The cleared decant liquor is used to wash the gangue free of product. All of the decantates are combined whereupon the slurry is heated with stirring for a period of about 2.5 hours after adding sulfuric acid dropwise to reduce the pH to six. The solid product is recovered by filtration and washed. About 44.4 grams of solid is recovered which is identified as mainly hydrated sodium antimonate.

EXAMPLE 3

An aqueous suspension of 50 grams of an antimony containing ore concentrate and 20 grams of potassium hydroxide in 500ml. of water is prepared and digested at 80°-90° C for 1.5 hours. The gangue is separated by filtration. To the clear filtrate there is added 0.5 grams of hydroquinone and 0.1 gram of copper sulfate pentahydrate. This mixture is sparged with air for about one hour whereupon the pH of the mixture gradually drops to about 9-10 at which time the oxidation is completed. The solution contains soluble hyrated potassium antimonate.

EXAMPLE 4

Sodium antimonate is obtained from the solution of potassium antimonate of Example 3 by adding 15g of sodium chloride dissolved in water. As this mixture is digested, the hydrated sodium antimonate precipitates and can be recovered.

EXAMPLE 5

The procedure of Example 4 is repeated except that the sodium chloride is replaced by an equivalent amount of barium chloride. The product obtained is the insoluble hydrated barium antimonate.

EXAMPLE 6

The procedure of Example 4 is repeated except that the sodium chloride is replaced by an equivalent amount of calcium chloride. The insoluble product obtained in this manner is hydrated calcium antimonate.

EXAMPLE 7

The procedure of Example 1 is repeated except that the hydroquinone is omitted from the mixture. A slower rate of oxidation is observed and the desired product is obtained.

EXAMPLE 8

The procedure of Example 4 is repeated except that the sodium chloride is replaced by an amount of copper sulfate which provides a molar ratio of 1 mole of copper sulfate per 2 moles of potassium antimonate in solution. The insoluble hydrated copper antimonate is isolated by filtration.

EXAMPLE 9

A mixture of 600 grams of an ore concentrate, (U.S. Antimony) 225 grams of sodium hydroxide, 225 grams of sodium sulfide (60%) in three liters of water is heated at 80°-85° C for 0.5 hour while hot, the gangue is separated from the solution by filtration. Hydroquinone (6.25 grams) is added to the filtrate solution which is then oxidized with air at a rate of about 15,600cc per minute. The temperature of the solution rises, and oxidation is continued until no positive test for sulfide ion can be obtained (about 4 hours). The mixture is cooled to 40° C and filtered. The filtrate is the desired hydrated sodium antimonate analyzing about 40.6% antimony, 9.4% sodium and less than 0.04% arsenic.

As mentioned earlier, the catalyst of the invention can be utilized to improve the rate of oxidation of an aqueous mixture of an antimony sulfide bearing ore and an acid thereby increasing the rate of extraction of antimony from the ore. When the extraction process is conducted in an acid medium the method differs from the method utilized in the extraction utilizing basic solution, and the product of the method also is different. The product of the method utilizing an acid solution is not pentavalent antimony but rather trivalent antimony. The extraction of antimony from ores using the acid process and the catalyst of the invention comprises the following steps:

a. preparing an aqueous mixture of the ore, an acid, and a small amount of catalyst comprising a water-soluble copper salt, a quinone, a hydroquinone, or mixtures of one or more of these,
b. passing oxygen through the aqueous acidic mixture,
c. separating the liquid from any solids present, and
d. recovering the desired antimony product from the liquid.

The acid utilized in the above method preferably is hydrochloric acid or a mixture of hydrochloric acid and sulfuric acid. Commercially available hydrochloric acid diluted 1:1 with water is found to be suitable. In the more dilute hydrochloric acid solutions, the rate of oxidation is slower and the antimony product is not soluble. In the more concentrated hydrochloric acid solutions, the rate of oxidation increases but hydrogen sulfide appears to be evolved.

The catalyst which is utilized in the acid treatment of the ore may be any of the catalysts described above with respect to the alkaline method of extraction, although the effect of the catalyst on the rate of oxidation is not as pronounced in the acid medium as it is in the basic medium. Copper sulfate, and more particularly, the combination of copper sulfate and potassium iodide on a weight ratio of about 1:1 to 1:0.2 appears to be the best catalyst for increasing the rate of oxidation in the acid mixture.

The mixture of ore, acid and catalyst is stirred vigorously and oxygen is passed through the mixture until sulfide ion has been eliminated from the mixture. Any source of oxygen may be utilized including pure oxygen of air which preferably is bubbled through the mixture to provide maximum contact with the liquid. It is preferred that the mixture be heated to a temperature of from about 70° C to about 90° C which increases the rate of oxidation.

The following test can be used to determine when the oxidation reaction is completed. Concentrated hydrochloric acid is added to a few drops of the oxidized ore-acid-catalyst mixture, and after a few minutes, water is added to dilute the mixture about three-fold. If sulfide ion is present, an orange precipitate of antimony sulfide will form. When the air oxidation is completed and sulfide ion is absent, the orange precipitate will not form.

When it is determined that the oxidation reaction is completed, the reaction mixture, while still hot, is filtered, and the residue is washed with 1:1 hydrochloric acid, the washings being added to the filtrate. The desired antimony is contained in the filtrate, and the residue is a black granular solid which contains free sulfur.

In contrast to the alkaline procedure which produces a pentavalent antimony, the acid procedure results in the formation of trivalent antimony. Although the exact mechanism for the oxidation and recovery of trivalent antimony in an acid medium is unknown, it is believed that the oxygen reacts with sulfide ion present in the mixture thereby preventing the formation of hydrogen sulfide and converting the trivalent antimony from the ore into a soluble complex ion such as a chloride complex when hydrochloric acid is used as the acid. Antimony oxychloride can be precipitated from the filtrate by, for example, dilution with water.

The following example illustrates the acid method of the invention for recovering antimony from an ore containing antimony sulfide:

EXAMPLE 10

A mixture of 300ml. of 21% hydrochloric acid, 1.0 gram of copper sulfide and 0.5g of potassium iodide is prepared in a container fitted with a sparger tube, magnetic stirrer and reflux condenser. An antimony ore concentrate (50g) containing about 50.0% antimony, 24.6% sulfur and 3.6% arsenic is added in small portions as the mixture is heated and sparged with oxygen gas. As long as sulfide ion is present in the mixture, the iodide remains reduced and the reflux liquid is colorless. When all of the sulfide is oxidized, indicating a completion of the oxidation reaction, the brown color of iodine appears in the reflux liquid.

After the oxidation is completed, the solids (gangue) are filtered off. The filtrate is distilled until, at a very small volume, trivalent antimony begins to appear in the distillate. The concentrate then is diluted with water to precipitate antimony oxychloride which is allowed to settle. If desired, the antimony oxychloride residue is brought to a pH of seven by the addition of sodium carbonate, and the mixture is boiled to produce antimony trioxide.

Although the metal antimonates which are obtained when the oxidation reaction is conducted in an alkaline or basic medium are useful, such antimonates can be readily and inexpensively converted to antimony trioxide. The conversion to antimony trioxide is inexpensive because it requires only very small amounts of acid such as hydrochloric or sulfuric acid in addition to the products of the oxidation reaction.

The conversion of the metal antiomonates formed as a result of the oxidation reaction in alkaline medium described above to antimony trioxide is accomplished by treating the oxidized aqueous leached mixture as follows. The pH of the oxidized aqueous mixture is adjusted to a pH of from about 1 to about 6, and preferably from about 5 to about 6 by the addition of small amount of one or more acids such as hydrochloric and sulfuric acid, and this acidified mixture is digested by heating and stirring at a temperature of from about 25° C to about 75° C. The solids are separated from the heated mixture such as by filtration, and the separated solid is heated to an elevated temperature which results in the formation of antimony trioxide.

When potassium hydroxide solutions are utilized to leach the antimony from the ores, the resulting potassium antimonate is water-soluble and the aqueous mixture resulting from the oxidation is a solution which is substantially free of a solid product. Accordingly, in this instance, sodium chloride is added to precipitate sodium antimonate. The precipitate and solution are agitated to form a slurry which is adjusted to a pH of from about 1 to 6 and preferably of from about 5 to 6 and heated with stirring at a temperature of from about 25° C to about 75° C for about 0.5 to 2 hours. The solid (principally sodium antimonate) is recovered from the slurry and heated to an elevated temperature, preferably, of from about 150° to about 400° C for a period of from about 0.5 to 2 hours whereupon antimony trioxide is formed.

If the insoluble metal antimonates are separated and recovered after the oxidation step without an adjustment of the pH of the solution followed by the above-described digestion at 25° C to about 75° C, the solid metal antimonate cannot be converted to antimony trioxide upon heating. At elevated temperatures such as of about 200° C, these antimonates lose water to form anhydrous metal antimonates which are stable at higher temperatures. Accordingly, the adjustment of the pH of the oxidized mixture and digestion prior to recover of the solids are essential features of the conversion of the metal antimonates to antimony trioxide.

A pH of between about 5 to 6 for the digestion is preferred because it appears that a purer form of antimony trioxide is obtained. When the pH is adjusted to the range of about 1 to 3, the solids produced on digestion develop an orange color indicating the possibility of formation of an antimony sulfide as an intermediate. However, heating of the removed solids does produce antimony trioxide although there appears to be more sulfur dioxide gas generated from these solids than when the solids are obtained by digestion at a pH of about 5–6.

The following example illustrates the preferred method of obtaining antimony trioxide from the oxidized aqueous alkaline leach mixtures of the invention.

EXAMPLE 11

Sulfuric acid is added dropwise to a portion of the combined decantate slurry obtained in Example 2 until the pH of the slurry is 6. The slurry is heated to about 50° C and maintained at the temperature with stirring for about 2.5 hours. Sulfuric acid is added during this period to maintain the pH at 6. The pH then is reduced to 5 by the addition of sulfuric acid, and the mixture is heated with stirring at this pH for 1 hour. The slurry is filtered, and the residue, identified mainly as hydrated sodium antimonate is recovered. This residue is heated, at a temperature of about 400° C, and antimony trioxide is obtained.

The embodiments of the invention in which an exclusive property or privilege is claimed are defined as follows:

1. A method of extracting and isolating antimony from antimony sulfide bearing solids which comprises the steps of
   (a) leaching the antimony values from the solids with an aqueous basic solution to form an antimony-containing solution and a gangue,
   (b) separating the leach solution from the gangue,
   (c) adding a catalyst comprising a water-soluble copper salt, quinone, a hydroquinone, or mixtures of one or more of these to the leach solution,
   (d) passing oxygen through the leach solution containing the catalyst whereby the antimony present in the solution is oxidized to a pentavalent antimony, and
   (e) recovering pentavalent antimony.

2. The method of claim 1 wherein the catalyst is a mixture of water soluble copper salt and a hydroquinone.

3. The method of claim 2 wherein the hydroquinone is a benzenediol.

4. The method of claim 3 wherein the benzenediol is 1,4-benzenediol.

5. The method of claim 2 wherein the copper salt is copper sulfate.

6. The method of claim 1 wherein the antimony in the oxidized aqueous mixture obtained in step (d) is converted to antimony trioxide by the steps of
 (i) adjusting the pH of the mixture to a pH of from about 1 to about 6 by the addition of one or more acids,
 (ii) stirring and heating the mixture at a temperature of from about 25° C to about 75° C,
 (iii) separating and collecting the solids in the heated mixture, and
 (iv) heating the collected solids to form antimony trioxide.

7. The method of claim 6 wherein the collected solids are heated at a temperature of from about 150° to about 400° C for a period of from about 0.5 to about 2 hours to form antimony trioxide.

8. The method of claim 6 wherein the pH of the mixture is adjusted in (i) to a pH of from about 5 to 6.

9. The method of claim 1 wherein the basic solution is a solution of sodium hydroxide or potassium hydroxide in water.

10. A method of extracting antimony from antimony sulfide bearing solids and recovering the antimony as sodium antimonate which comprises the steps of
 (a) leaching the antimony values from the solids with an aqueous basic solution containing sodium hydroxide to form an antimony-containing solution and a gangue,
 (b) separating the leach solution from the gangue,
 (c) adding a catalyst comprising a water-soluble copper salt, a quinone, a hydroquinone, or mixtures of one or more of these to the leach solution,
 (d) passing oxygen through the leach solution containing the catalyst whereby the antimony present is oxidized to pentavalent antimony and sodium antimonate precipitates from the solution, and
 (e) recovering the solid sodium antimonate.

11. The method of claim 10 wherein the catalyst is a mixture of a copper salt and a hydroquinone.

12. The method of claim 11 wherein the catalyst is a mixture of copper sulfate and 1,4-benzenediol.

13. The method of claim 12 wherein the weight ratio of copper sulfate to 1,4-benzenediol is in the range of from about 1:1 to about 1:5.

14. The method of claim 10 wherein the basic solution comprises a mixture of sodium hydroxide and sodium sulfide.

15. The method of claim 14 wherein the weight ratio of sodium hydroxide to sodium sulfide is within the range of from about 1:1 to about 3:1.

16. The method of claim 10, wherein the sodium antimonate obtained in step (d) is converted to antimony trioxide by the steps of
 (i) adjusting the pH of the oxidized aqueous mixture obtained in step (d) to a pH of from about 1 to about 6 by the addition of one or more acids,
 (ii) stirring and heating the mixture at a temperature of from about 25° to about 75° C,
 (iii) separating and collecting the solids in the heated mixture, and,
 (iv) heating the collected solids to form antimony trioxide.

17. In a method of extracting antimony from antimony sulfide bearing solids by oxidation of an aqueous mixture of the solids and an acid, and recovering trivalent antimony resulting from said oxidation, the improvement comprising conducting the oxidation in the presence of a catalyst comprising a water-soluble copper salt, a quinone, a hydroquinone, or mixtures of one or more of these.

18. The method of claim 17 wherein the catalyst is a mixture of a water-soluble copper salt and a hydroquinone.

19. The method of claim 18 wherein the hydroquinone is a benzenediol.

20. The method of claim 19 wherein the benzenediol is 1,4-benzenediol.

21. The method of claim 19 wherein the copper salt is copper sulfate.

22. The method of claim 17 wherein the catalyst comprises a copper salt.

23. A method of extracting antimony from antimony sulfide bearing solids and recovering pentavalent antimony as potassium antimonate which comprises the steps of
 (a) leaching the antimony values from the solids with a solution of potassium hydroxide in water to form an antimony containing solution and a gangue,
 (b) separating the leach solution from the gangue,
 (c) adding a catalyst comprising a mixture of water-soluble copper salt and a hydroquinone to the leach solution,
 (d) passing oxygen through the leach solution containing the catalyst whereby the antimony present is oxidized to pentavalent antimony and water-soluble potassium antimonate is formed.

24. The method of claim 23 wherein the antimony in the oxidized aqueous mixture obtained in step (d) is converted to antimony trioxide by the steps of
 (i) adding a water-soluble metal salt to the solution to form and precipitate a water-insoluble metal antimonate,
 (ii) stirring the mixture containing the insoluble antimonate to form a slurry,
 (iii) adjusting the pH of the slurry to a pH of about 5 to 6 by the addition of one or more acids,
 (iv) heating and digesting the mixture at a temperature of from about 25° C to about 75° C,
 (v) separating the solids from the heated mixture,
 (vi) heating the solid at a temperature of from about 150° to about 400° C to form antimony trioxide.

25. The method of claim 24 wherein the pH of the slurry is adjusted to from about 5 to about 6.

26. The method of claim 23 wherein the catalyst comprises a mixture of copper sulfate and a hydroquinone in a ratio of from about 1:1 to about 1:3.

27. A method of extracting antimony from antimony sulfide and arsenic bearing solids and recovering the antimony as a water-insoluble metal antimonate substantially free of arsenic which comprises the steps of
 (a) leaching the antimony values from the solids with a solution of potassium hydroxide in water to form an antimony containing solution and gangue,
 (b) adding a catalyst comprising a water-soluble copper salt, a quinone, a hydroquinone, or mixtures of one or more of these to the leach solution,
 (c) passing oxygen through the leach solution containing the catalyst whereby the antimony present is oxidized to pentavalent antimony and water-soluble potassium antimonate is formed,
 (d) separating the oxidized solution from the gangue and other solids, (e) adding a water-soluble metal salt, to the solution to from and precipitate the water-insoluble metal antimonate.

28. The process of claim 27 wherein the water-soluble metal salt added in step (e) is a metal hydroxide or metal chloride.

29. The process of claim 27 wherein the gangue is separated from the solution after leaching in step (a) and prior to addition of the catalyst in step (b).

30. In a method of extracting antimony from antimony sulfide bearing ores by oxidation of a leaching liquor obtained by leaching the antimony from the solids with an aqueous basic solution and recovering pentavalent antimony resulting from said oxidation, the improvement comprising conducting the oxidation in the presence of a catalyst comprising a water-soluble copper salt, a quinone, a hydroquinone, or mixtures of one or more of these.

31. The method of claim 30 wherein the catalyst comprises a copper salt.

32. The method of claim 30 wherein the catalyst is a mixture of a water-soluble copper salt and a hydroquinone.

33. A method of extracting antimony from antimony sulfide bearing solids and recovering the antimony as antimony trioxide which comprises the steps of
   (a) leaching the antimony values from the solids with an aqueous basic solution containing sodium hydroxide and sodium sulfide to form an antimony-containing solution and a gangue,
   (b) separating the leach solution from the gangue,
   (c) adding a catalyst comprising a water-soluble copper salt, a quinone, a hydroquinone, or mixtures of one or more of these to the leach solution,
   (d) passing oxygen through the leach solution containing the catalyst whereby the antimony present is oxidized to pentavalent antimony and sodium antimonate precipitates from the solution,
   (e) adjusting the pH of the mixture obtained in (d) to a pH of from about 1 to about 6 by the addition of one or more acids,
   (f) stirring and heating the mixture at a temperature of from about 25° C to about 75° C,
   (g) separating and collecting the solids in the heated mixture, and
   (h) heating the collected solids to form antimony trioxide.

* * * * *

UNITED STATES PATENT OFFICE
CERTIFICATE OF CORRECTION

PATENT NO. : 4,096,232
DATED : June 20, 1978
INVENTOR(S) : John W. Vogt

It is certified that error appears in the above-identified patent and that said Letters Patent are hereby corrected as shown below:

Column 3 - line 36 - the first "a" should be "of".
Column 3 - line 36 & 37 - the word "catalysts" should be "catalyst". Column 3 - line 44 - should read " taining antimony sulfide is catalyzed by the incorporation of a small amount of copper sulfate" or 1,4-benzenediol, an even Column 7 - line 12 -"sulfide" should be "sulfate".
Column 11 - Line 2 - "from" should be "form".

Signed and Sealed this

Sixteenth Day of January 1979

[SEAL]

Attest:

RUTH C. MASON
Attesting Officer

DONALD W. BANNER
Commissioner of Patents and Trademarks